United States Patent
Okazaki

(10) Patent No.: US 9,616,918 B2
(45) Date of Patent: Apr. 11, 2017

(54) VEHICLE STEERING SYSTEM AND VEHICLE STEERING METHOD

(71) Applicant: Chikara Okazaki, Gotenba (JP)

(72) Inventor: Chikara Okazaki, Gotenba (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/367,657

(22) PCT Filed: Dec. 6, 2012

(86) PCT No.: PCT/IB2012/002606
§ 371 (c)(1),
(2) Date: Jun. 20, 2014

(87) PCT Pub. No.: WO2013/093584
PCT Pub. Date: Jun. 27, 2013

(65) Prior Publication Data
US 2015/0032336 A1    Jan. 29, 2015

(30) Foreign Application Priority Data

Dec. 22, 2011  (JP) ................................. 2011-280834
Jan. 25, 2012  (JP) ................................. 2012-012919

(51) Int. Cl.
  *G05D 1/00* (2006.01)
  *B62D 5/04* (2006.01)
  *B62D 6/00* (2006.01)

(52) U.S. Cl.
CPC ......... *B62D 5/0463* (2013.01); *B62D 5/0466* (2013.01); *B62D 6/008* (2013.01)

(58) Field of Classification Search
CPC ..... B62D 5/0463; B62D 5/0466; B62D 6/008
(Continued)

(56) References Cited

U.S. PATENT DOCUMENTS 5,198,981 A * 3/1993 Collier-Hallman .. B62D 5/0463
                                                          180/446
5,398,953 A * 3/1995 Shimizu ............... B62D 5/0463
                                                          180/446
(Continued)

FOREIGN PATENT DOCUMENTS

CN      101863285 A    10/2010
EP      2 186 709 A1   5/2010
(Continued)

OTHER PUBLICATIONS

International Search Report issued Mar. 25, 2013, in PCT/IB2012/002606, filed Dec. 6, 2012.

*Primary Examiner* — Ian Jen
(74) *Attorney, Agent, or Firm* — Oblon, McClelland, Maier & Neustadt, L.L.P.

(57) ABSTRACT

In a vehicle steering that sets a target steering reaction force to be applied to a steering wheel on the basis of a steering angle of the steering wheel and that applies the target steering reaction force to the steering wheel; the target steering reaction force is set so that the target steering reaction force changes on the basis of whether a steering mode of the steering wheel is turn steering in which the absolute value of a steered angle of a steered wheel is increased or return steering in which the absolute value of the steered angle is reduced; and the set target steering reaction force is applied to the steering wheel.

9 Claims, 7 Drawing Sheets

(58) Field of Classification Search
USPC .......................................................... 701/42
See application file for complete search history.

(56) References Cited

U.S. PATENT DOCUMENTS

| | | | | |
|---|---|---|---|---|
| 8,719,327 | B2* | 5/2014 | Blevins | G05B 11/42 702/185 |
| 2002/0060538 | A1* | 5/2002 | Hara | B62D 5/0466 318/432 |
| 2002/0125063 | A1* | 9/2002 | Kurishige | B62D 6/008 180/443 |
| 2004/0079578 | A1 | 4/2004 | Kurishige et al. | |
| 2005/0096830 | A1* | 5/2005 | Ohta | B60K 28/165 701/91 |
| 2006/0069481 | A1* | 3/2006 | Kubota | B62D 5/0463 701/41 |
| 2007/0029129 | A1* | 2/2007 | Shiozawa | B62D 6/04 180/446 |
| 2007/0168093 | A1* | 7/2007 | Nishiyama | B62D 5/0466 701/41 |
| 2007/0209859 | A1* | 9/2007 | Miyajima | B62D 5/065 180/441 |
| 2008/0066994 | A1* | 3/2008 | Fujita | B62D 5/0463 180/446 |
| 2008/0156572 | A1* | 7/2008 | Kasahara | B62D 5/003 180/402 |
| 2008/0230300 | A1* | 9/2008 | Hara | B62D 6/008 180/402 |
| 2009/0050397 | A1* | 2/2009 | Onuma | B62D 5/006 180/402 |
| 2009/0105907 | A1* | 4/2009 | Yamaguchi | B62D 5/008 701/41 |
| 2009/0120714 | A1* | 5/2009 | Hisanaga | B62D 5/046 180/446 |
| 2009/0157261 | A1* | 6/2009 | Yamazaki | B62D 5/0466 701/42 |
| 2009/0266641 | A1* | 10/2009 | Ehara | B62D 5/0466 180/446 |
| 2010/0121531 | A1* | 5/2010 | Oniwa | B62D 5/0463 701/41 |
| 2011/0029198 | A1* | 2/2011 | Mizuta | B60G 17/06 701/38 |
| 2011/0060505 | A1* | 3/2011 | Suzuki | B60T 7/12 701/42 |
| 2011/0144864 | A1* | 6/2011 | Kageyama | B62D 7/1581 701/41 |
| 2013/0103262 | A1* | 4/2013 | Okazaki | B62D 6/00 701/41 |
| 2013/0110352 | A1* | 5/2013 | Doi | B62D 6/008 701/42 |
| 2015/0032336 | A1* | 1/2015 | Okazaki | B62D 5/0466 701/42 |

FOREIGN PATENT DOCUMENTS

| | | |
|---|---|---|
| JP | 6-56046 | 3/1994 |
| JP | 2002-145100 A | 5/2002 |
| JP | 2006-137215 | 6/2006 |
| JP | 2006-159963 A | 6/2006 |
| JP | 2011-105190 A | 6/2011 |
| JP | 2012-11861 | 1/2012 |
| JP | 2012-17062 | 1/2012 |
| WO | 2006/059214 A2 | 6/2006 |

* cited by examiner

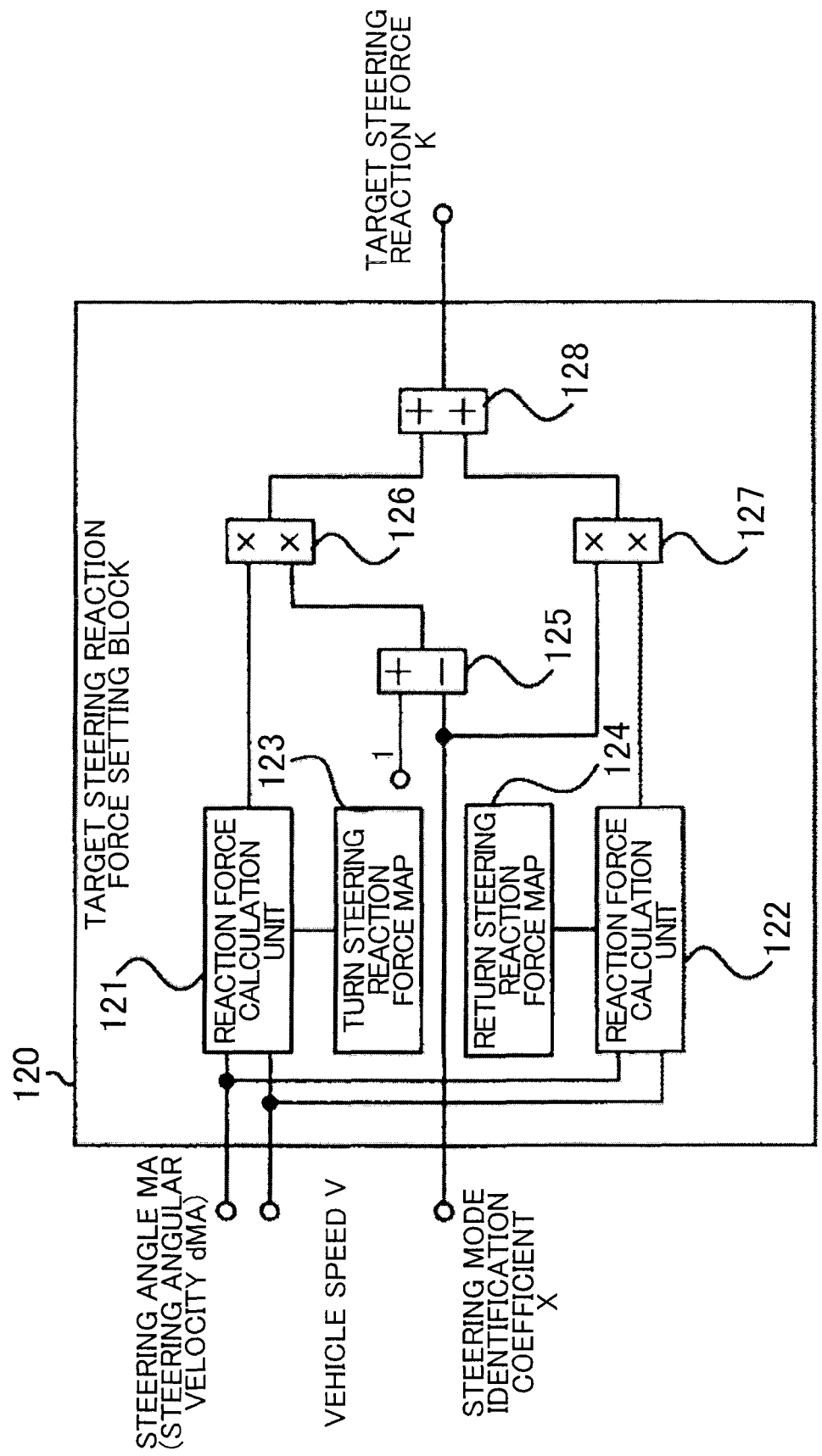

VEHICLE STEERING SYSTEM AND VEHICLE STEERING METHOD

BACKGROUND OF THE INVENTION

1. Field of the Invention

The invention relates to a vehicle steering system and a vehicle steering method.

2. Description of Related Art

There is known an electric power steering (EPS) as a vehicle steering system of this type (for example, see U.S. Pat. No. 5,198,981). The electric power steering executes reaction force control in which a target steering reaction force (or a target steering torque) to be applied to a steering wheel is set on the basis of a steering angle and a vehicle speed and then the target steering reaction force is applied to the steering wheel. By executing such reaction force control, it is possible to improve driver's steering feeling. Other than the above, there are Japanese Patent Application Publication No. 06-056046 (JP 06-056046 A) and Japanese Patent Application Publication No. 2006-137215 (JP 2006-137215 A) as related art documents related to the invention.

Incidentally, a steering mode of a steering wheel includes two modes, that is, turn steering and return steering. In the turn steering, the steering wheel is steered in a direction to increase the absolute value of a steered angle of steered wheels (for example, front wheels). In the return steering, the steering wheel is steered in a direction to reduce the absolute value of the steered angle of the steered wheels. However, in the technique described in the U.S. Pat. No. 5,198,981, for example, it is not taken into consideration whether the steering mode of the steering wheel is turn steering or return steering, and a target steering reaction force is uniformly set on the basis of the steering angle. Therefore, for example, depending on the steering mode of the steering wheel, a feeling of strangeness may be experienced by a driver. As a result, there is a technical problem that it may be difficult to improve driver's steering feeling.

SUMMARY OF THE INVENTION

The invention provides a vehicle steering system and a vehicle steering method that are, for example, able to improve driver's steering feeling.

A first aspect of the invention provides a vehicle steering system that sets a target steering reaction force to be applied to a steering wheel on the basis of a steering angle of the steering wheel and that applies the target steering reaction force to the steering wheel. The vehicle steering system includes: a setting unit that sets the target steering reaction force so that the target steering reaction force changes on the basis of whether a steering mode of the steering wheel is turn steering in which the absolute value of a steered angle of a steered wheel is increased or return steering in which the absolute value of the steered angle is reduced; and an application unit that applies the target steering reaction force set by the setting unit to the steering wheel.

With the vehicle steering system according to the above aspect, the setting unit sets the target steering reaction force (that is, a target value of a steering reaction force to be applied to the steering wheel) on the basis of at least one of the steering angle (in other words, a proportional term of the steering angle) of the steering wheel and a derivative term of the steering angle. Furthermore, the application unit applies the target steering reaction force (in other words, a torque corresponding to the target steering reaction force) set by the setting unit to the steering wheel. Note that, when the application unit is a controller, such as an ECU, the application unit controls operation of a motor, or the like, that actually generates the target steering reaction force such that the target steering reaction force set by the setting unit is applied to the steering wheel. Alternatively, when the application unit is a driving source, such as a motor, the application unit actually generates the target steering reaction force set by the setting unit and applies the generated target steering reaction force to the steering wheel.

In the above aspect, particularly, the setting unit sets the target steering reaction force such that the target steering reaction force changes on the basis of the steering mode of the steering wheel. Specifically, the setting unit sets the target steering reaction force such that the target steering reaction force changes on the basis of whether the steering mode of the steering wheel is the turn steering. In other words, the setting unit sets the target steering reaction force such that the target steering reaction force changes on the basis of whether the steering mode of the steering wheel is the return steering. Specifically, the setting unit sets the target steering reaction force such that the target steering reaction force changes on the basis of whether the steering mode of the steering wheel is the turn steering or the return steering. Note that the "turn steering" typically means the steering mode in which the absolute value of the steered angle of the steered wheel is increased. On the other hand, the "return steering" typically means the steering mode in which the absolute value of the steered angle of the steered wheel is reduced.

In this way, in the above aspect, the setting unit is able to set the target steering reaction force such that the target steering reaction force changes on the basis of the steering mode of the steering wheel. Thus, the setting unit is able to set the target steering reaction force while taking a difference in the steering mode of the steering wheel into consideration. Therefore, for example, there is a less possibility or no possibility that a feeling of strangeness of steering feeling due to a difference in the steering mode of the steering wheel is experienced by a driver. As a result, it is possible to improve driver's steering feeling.

In the above aspect, the setting unit may set the target steering reaction force so that the target steering reaction force that is set in the case where the steering mode is the turn steering differs from the target steering reaction force that is set in the case where the steering mode is the return steering.

According to the above aspect, the setting unit is able to set the target steering reaction force such that the target steering reaction force changes on the basis of the steering mode of the steering wheel. Therefore, it is possible to improve driver's steering feeling.

Note that, as will be described in detail later, the setting unit may set the target steering reaction force while distinguishing the steering mode of the steering wheel into two types of states, that is, the turn steering and the return steering. Alternatively, the setting unit may set the target steering reaction force while distinguishing the steering mode of the steering wheel into multiple types of states (for example, multiple types of states that a degree of the return steering is X (where X is a real number that satisfies $0 \leq X \leq 1$) and a degree of the turn steering is $1-X$). In any cases, the setting unit just needs to set the target steering reaction force such that the target steering reaction force changes on the basis of the steering mode of the steering wheel.

In the above aspect, the setting unit may set the target steering reaction force on the basis of at least one of a proportional term of the steering angle and a derivative term of the steering angle.

According to the above aspect, the setting unit is able to suitably set the target steering reaction force on the basis of at least one of the proportional term of the steering angle of the steering wheel and the derivative term of the steering angle. Note that the proportional term of the steering angle of the steering wheel is, for example, a value that is the steering angle itself or that is directly proportional to the steering angle. In addition, the derivative term of the steering angle is, for example, a time-derivative value of the steering angle and is actually a value that coincides with a steering angular velocity.

In the above-described aspect of the vehicle steering system in which the target steering reaction force is set on the basis of at least one of the proportional term of the steering angle and the derivative term of the steering angle, the setting unit may set the target steering reaction force on the basis of at least one of a plurality of pieces of mapping information, each of which defines a correlation between at least one of a proportional term of the steering angle and a derivative term of the steering angle and the target steering reaction force, and the setting unit may set the target steering reaction force on the basis of whether the steering mode of the steering wheel is the turn steering or the return steering by selecting the at least one of the pieces of mapping information on the basis of whether the steering mode of the steering wheel is the turn steering or the return steering.

With this configuration, the setting unit is able to set the target steering reaction force on the basis of at least one of the plurality of pieces of mapping information, so it is possible to relatively easily set the target steering reaction force on the basis of the steering mode of the steering wheel.

In the above-described aspect of the vehicle steering system in which the target steering reaction force is set on the basis of at least one of the plurality of pieces of mapping information, the plurality of pieces of mapping information may include; (i) first mapping information that defines a correlation between at least one of a proportional term of the steering angle and a derivative term of the steering angle in the case where the steering mode is the turn steering and the target steering reaction force, and (ii) second mapping information that defines a correlation between at least one of a proportional term of the steering angle and a derivative term of the steering angle in the case where the steering mode is the return steering and the target steering reaction force, and the setting unit may set a weighted average as the target steering reaction force, the weighted average may be an average between the target steering reaction force that is set on the basis of the first mapping information and the target steering reaction force that is set on the basis of the second mapping information, and the weighted average may be based on whether the steering mode of the steering wheel is the turn steering or the return steering.

With this configuration, the setting unit is able to set the target steering reaction force while distinguishing the steering mode of the steering wheel into multiple types of states (for example, multiple types of states that a degree of the return steering is X (where X is a real number that satisfies 0≤X≤1) and a degree of the turn steering is 1−X in addition to or instead of distinguishing the steering mode of the steering wheel into two types of states, that is, the turn steering and the return steering. More specifically, where a degree of the return steering is X, a degree of the turn steering is 1−X, a target steering reaction force that is set on the basis of the first mapping information is K1 and a target steering reaction force that is set on the basis of the second mapping information is K2, the setting unit is, for example, able to set a weighted average that K1×(1−X)+K2×X as the target steering reaction force. Thus, the setting unit is able to appropriately set the target steering reaction force such that the target steering reaction force changes on the basis of the steering mode of the steering wheel.

In the above-described aspect of the vehicle steering system in which the target steering reaction force is set on the basis of at least one of the plurality of pieces of mapping information, the plurality of pieces of mapping information may include (i) first mapping information that defines a correlation between at least one of a proportional term of the steering angle and a derivative term of the steering angle in the case where the steering mode is the turn steering and the target steering reaction force, and (ii) second mapping information that defines a correlation between at least one of a proportional term of the steering angle and a derivative term of the steering angle in the case where the steering mode is the return steering and the target steering reaction force, and the setting unit may set the target steering reaction force on the basis of one of the first mapping information and the second mapping information, which is selected on the basis of whether the steering mode of the steering wheel is the turn steering or the return steering.

With this configuration, the setting unit is able to set the target steering reaction force while distinguishing the steering mode of the steering wheel into two types of states, that is, the turn steering and the return steering. Thus, the setting unit is able to appropriately set the target steering reaction force such that the target steering reaction force changes on the basis of the steering mode of the steering wheel.

In the above-described aspect of the vehicle steering system in which the target steering reaction force is set on the basis of at least one of the proportional term of the steering angle and the derivative term of the steering angle, the setting unit may calculate a pre-target steering reaction force on the basis of mapping information that defines a correlation between at least one of a proportional term of the steering angle and a derivative term of the steering angle and the target steering reaction force, and may set the target steering reaction force by multiplying the calculated pre-target steering reaction force by a predetermined gain that is determined on the basis of whether the steering mode of the steering wheel is the turn steering or the return steering.

With this configuration, the setting unit is able to set the target steering reaction force on the basis of a single piece of mapping information by adjusting a gain of the target steering reaction force, calculated on the basis of the single piece of mapping information. Therefore, the setting unit is able to relatively easily set the target steering reaction force on the basis of the steering mode of the steering wheel.

In the above aspect, the vehicle steering system may further include an identification unit that identifies whether the steering mode of the steering wheel is the turn steering or the return steering, wherein the setting unit may set the target steering reaction force so that the target steering reaction force changes on the basis of the steering mode identified by the identification unit.

According to the above aspect, the setting unit is able to set the target steering reaction force on the basis of the steering mode of the steering wheel, identified by the identification unit, so it is possible to relatively easily set the target steering reaction force on the basis of the steering mode of the steering wheel.

In the above-described aspect of the vehicle steering system that includes the identification unit, the identification unit may identify whether the steering mode of the steering wheel is the turn steering or the return steering on the basis of the steering angle and a steering angular velocity of the steering wheel.

With this configuration, the identification unit is able to relatively easily identify whether the steering mode of the steering wheel is the turn steering or the return steering.

Another aspect of the invention provides a vehicle steering method that sets a target steering reaction force to be applied to a steering wheel on the basis of a steering angle of the steering wheel and that applies the target steering reaction force to the steering wheel. The vehicle steering method includes: setting the target steering reaction force so that the target steering reaction force changes on the basis of whether a steering mode of the steering wheel is turn steering in which the absolute value of a steered angle of a steered wheel is increased or return steering in which the absolute value of the steered angle is reduced; and applying the target steering reaction force set by the setting unit to the steering wheel.

Operations and other advantages of the aspects of the invention are become apparent from embodiments described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is a block diagram that illustrates processes from step S102 to step S104 of FIG. 2, which are executed by a target steering reaction force setting block, together with the configuration of the target steering reaction force setting block;

DETAILED DESCRIPTION OF EMBODIMENTS

Hereinafter, an embodiment of the invention will be described with reference to the accompanying drawings.

(1) Configuration of Vehicle

Figure 1:
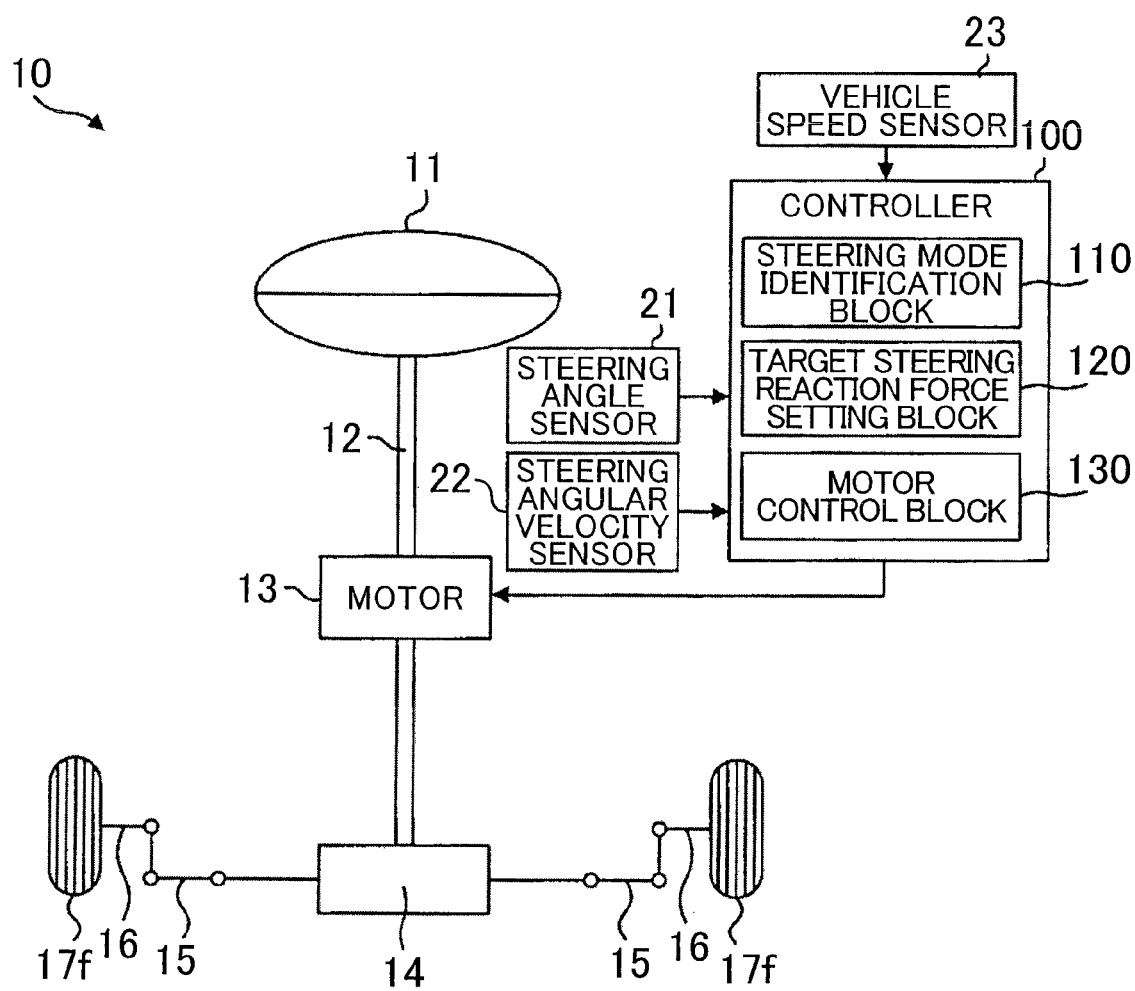
FIG. 1 is a block diagram that shows the overall configuration of a vehicle that includes a vehicle steering system according to an embodiment.

First, the overall configuration of a vehicle that includes a vehicle steering system according to the embodiment will be described with reference to FIG. 1. FIG. 1 is a block diagram that shows the overall configuration of the vehicle that includes the vehicle steering system according to the present embodiment.

As shown in FIG. 1, the vehicle 10 that includes the vehicle steering system according to the present embodiment includes a steering wheel 11, a steering shaft 12, a motor 13, a rack-and-pinion portion 14, tie rods 15, knuckle arms 16, front wheels 17f, a steering angle sensor 21, a steering angular velocity sensor 22, a vehicle speed sensor 23 and a controller 100.

The steering wheel 11 (hereinafter, referred to as "steering 11" where appropriate) is an example of a "steering wheel" according to the aspect of the invention, and is steered (in other words, operated) by a driver in order to, for example, turn the vehicle 10. The steering 11 is connected to the rack-and-pinion portion 14 via the steering shaft 12. The steering angle sensor 21, the steering angular velocity sensor 22 and the motor 13 are provided for the steering shaft 12.

The steering angle sensor 21 detects a steering angle MA corresponding to driver's steering operation of the steering 11. The steering angle sensor 21 supplies the detected steering angle MA to the controller 100.

The steering angular velocity sensor 22 detects a steering angular velocity dMA (that is, a parameter corresponding to the time derivative value of the steering angle MA that is detected by the steering angle sensor 21) corresponding to driver's steering operation of the steering 11. The steering angular velocity sensor 22 supplies the detected steering angular velocity dMA to the controller 100. Note that the steering angular velocity dMA that is detected by the steering angular velocity sensor 22 can also be obtained by obtaining the time derivative of the steering angle MA that is detected by the steering angle sensor 21. Therefore, the vehicle 10 does not need to include the steering angular velocity sensor 22 when the steering angular velocity dMA is obtained by obtaining the time derivative of the steering angle MA that is detected by the steering angle sensor 21.

The vehicle speed sensor 23 detects a vehicle speed V of the vehicle 10, and supplies the detected vehicle speed V to the controller 100.

The motor 13 is formed of a speed reducer, an electric motor, and the like, and applies torque to the steering shaft 12 under control executed by the controller 100.

The rack-and-pinion portion 14 is formed of a rack and a pinion, and operates upon reception of rotation that is transmitted from the steering shaft 12. The tie rods 15 and the knuckle arms 16 are coupled to the rack-and-pinion portion 14. The front wheel 17f that is an example of a "steered wheel" according to the aspect of the invention is coupled to each knuckle arm 16. In this case, as the tie rods 15 and the knuckle arms 16 are actuated by the rack-and-pinion portion 14, the front wheels 17f coupled to the knuckle arms 16 are turned.

The controller 100 is an example of a "vehicle steering system" according to the aspect of the invention, and is an electronic control unit that includes a central processing unit (CPU), a read only memory (ROM), a random access memory (RAM), and the like. The controller 100 sets a target steering reaction force K on the basis of the steering angle MA that is supplied from the steering angle sensor 21, the steering angular velocity dMA that is supplied from the steering angular velocity sensor 22 and the vehicle speed V that is supplied from the vehicle speed sensor 23. The controller 100 executes reaction force control in which the motor 13 is controlled such that the set target steering reaction force K is applied to the steering 11. That is, in reaction force control, the operation of the motor 13 is controlled by the controller 100 such that the target steering reaction force K is applied from the motor 13 to the steering 11 via the steering shaft 12. Note that application of the target steering reaction force K is typically achieved by applying a torque, corresponding to a difference between a current steering torque MT of the steering 11 and the target steering reaction force K, to the steering 11; however, application of the target steering reaction force K may be achieved in another mode.

Particularly, in the present embodiment, the controller 100 executes reaction force control such that the target steering reaction force K changes on the basis of a steering mode of the steering 11. More specifically, the controller 100, for example, executes reaction force control such that the target steering reaction force K that is set in the case where the steering mode of the steering 11 is turn steering differs from the target steering reaction force K that is set in the case where the steering mode of the steering 11 is return steering.

Note that the "turn steering" means the steering mode in which the absolute value of the steered angle of the front wheels 17$f$, each of which is an example of the steered wheel, is increased. On the other hand, the "return steering" means the steering mode in which the absolute value of the steered angle of the front wheels 17$f$, each of which is an example of the steered wheel, is reduced. The turn steering and the return steering in the vehicle 10 in which the front wheels 17$f$ are turned rightward with respect to a travelling direction through clockwise rotation of the steering 11 and the front wheels 17$f$ are turned leftward with respect to the travelling direction through counterclockwise rotation of the steering 11 will be described by way of example. When the steering 11 is rotated in the clockwise direction or in the counterclockwise direction from a state where the steered angle of the front wheels 17$f$ is 0, the absolute value of the steered angle of the front wheels 17$f$ increases. Similarly, when the steering 11 is rotated in the clockwise direction from a state where the front wheels 17$f$ are turned rightward with respect to the travelling direction, the absolute value of the steered angle of the front wheels 17 increases. Similarly, when the steering 11 is rotated in the counterclockwise direction from a state where the front wheels 17$f$ are turned leftward with respect to the travelling direction, the absolute value of the steered angle of the front wheels 17$f$ increases. Thus, these three types of steering modes are typically the turn steering. On the other hand, when the steering 11 is rotated in the clockwise direction from a state where the front wheels 17$f$ are turned leftward with respect to the travelling direction, the absolute value of the steered angle of the front wheels 17$f$ reduces. Similarly, when the steering 11 is rotated in the counterclockwise direction from a state where the front wheels 17$f$ are turned rightward with respect to the travelling direction, the absolute value of the steered angle of the front wheels 17$f$ reduces. Thus, these two types of steering modes are typically the return steering.

In order to execute such reaction force control, the controller 100 includes a steering mode identification block 110, a target steering reaction force setting block 120 and a motor control block 130 as processing blocks that are physically implemented as hardware circuits, or the like, inside or logically implemented as processing routines.

The steering mode identification block 110 is an example of an "identification unit" according to the aspect of the invention, and identifies (in other words, determines) the steering mode of the steering 11. More specifically, the steering mode identification block 110 may, for example, identify whether the steering mode of the steering 11 is the turn steering (furthermore, where necessary, the element of the turn steering is stronger than the element of the return steering) or the return steering (furthermore, where necessary, the element of the return steering is stronger than the element of the turn steering). At this time, the steering mode identification block 110 may identify the steering mode of the steering 11 on the basis of the steering angle MA detected by the steering angle sensor 21, the steering angular velocity dMA detected by the steering angular velocity sensor 22, and the like. Note that the steering mode identification block 110 will be described in detail later (see FIG. 3A to FIG. 3C).

The target steering reaction force setting block 120 is an example of a "setting unit" according to the aspect of the invention, and sets the target steering reaction force K on the basis of the steering angle MA that is supplied from the steering angle sensor 21, the steering angular velocity dMA that is supplied from the steering angular velocity sensor 22, the vehicle speed V that is supplied from the vehicle speed sensor 23 and the steering mode of the steering 11, identified by the steering mode identification block 110. Note that the target steering reaction force setting block 120 will be described later in detail (see FIG. 4A to FIG. 4E).

The motor control block 130 is an example of an "application unit" according to the aspect of the invention, and controls the motor 13 such that the target steering reaction force K set in the target steering reaction force setting block 120 is applied to the steering 11. For example, the motor control block 130 may drive the motor 13 by converting the target steering reaction force K (in other words, the torque corresponding to the difference between the target steering reaction force K and the current steering torque MT) set in the target steering reaction force setting block 120 to a driving signal of the motor 13 and then supplying the driving signal to the motor 13. As a result, the target steering reaction force K is applied from the motor 13 to the steering 11.

(2) Flow of Reaction Force Control

Figure 2:
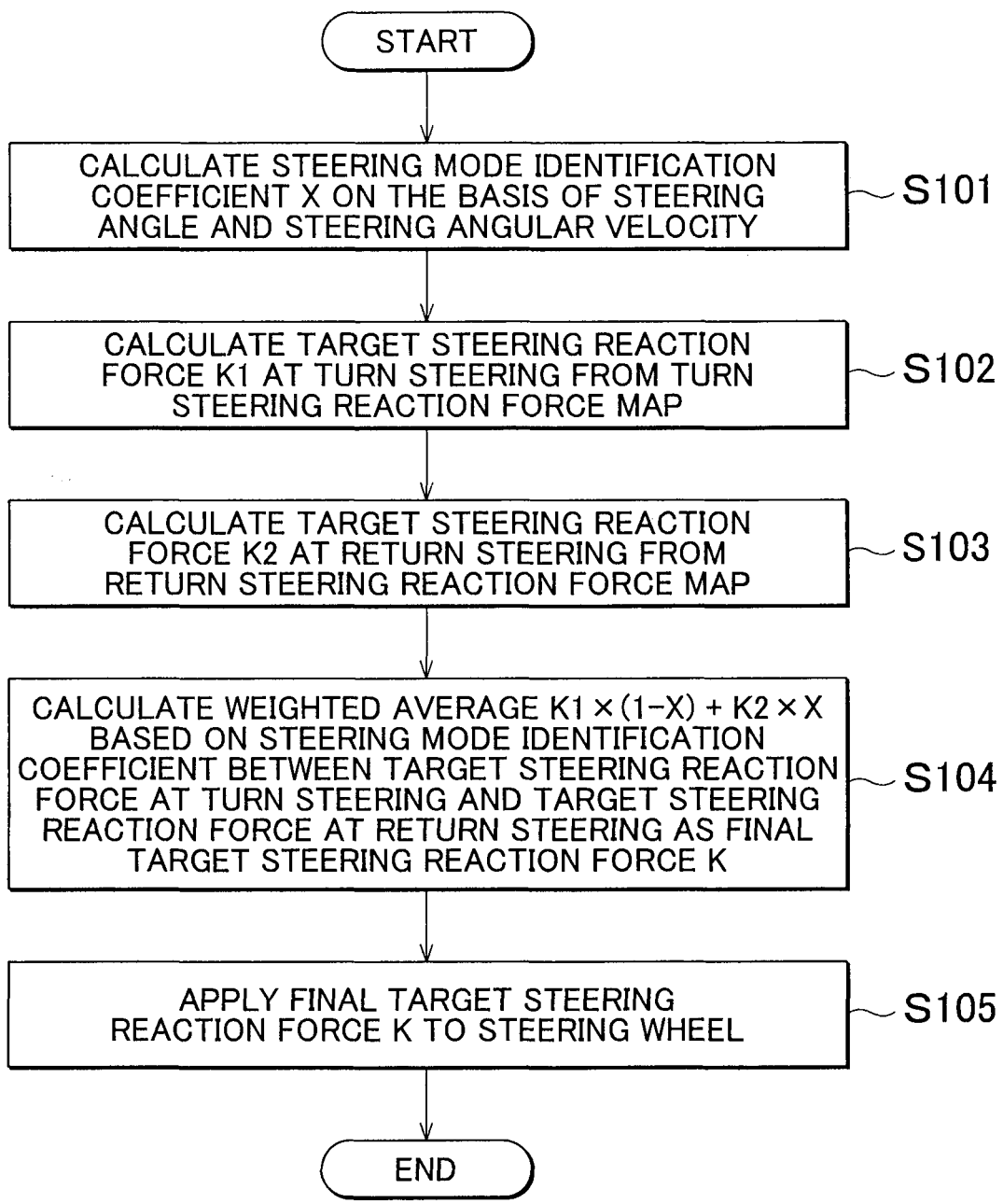
FIG. 2 is a flowchart that shows the flow of reaction force control that is mainly executed by a controller according to the embodiment.

Subsequently, the reaction force control that is mainly executed by the controller 100 according to the present embodiment will be described with reference to FIG. 2. FIG. 2 is a flowchart that shows the flow of reaction force control that is mainly executed by the controller 100 according to the present embodiment.

As shown in FIG. 2, first, the steering mode identification block 110 included in the controller 100 identifies the steering mode of the steering 11 (step S101). That is, the steering mode identification block 110 identifies whether the steering mode of the steering 11 is the turn steering or the return steering (step S101). In the present embodiment, the steering mode identification block 110 identifies the steering mode of the steering 11 by calculating a steering mode identification coefficient X for identifying the steering mode of the steering 11.

Figure 3A:
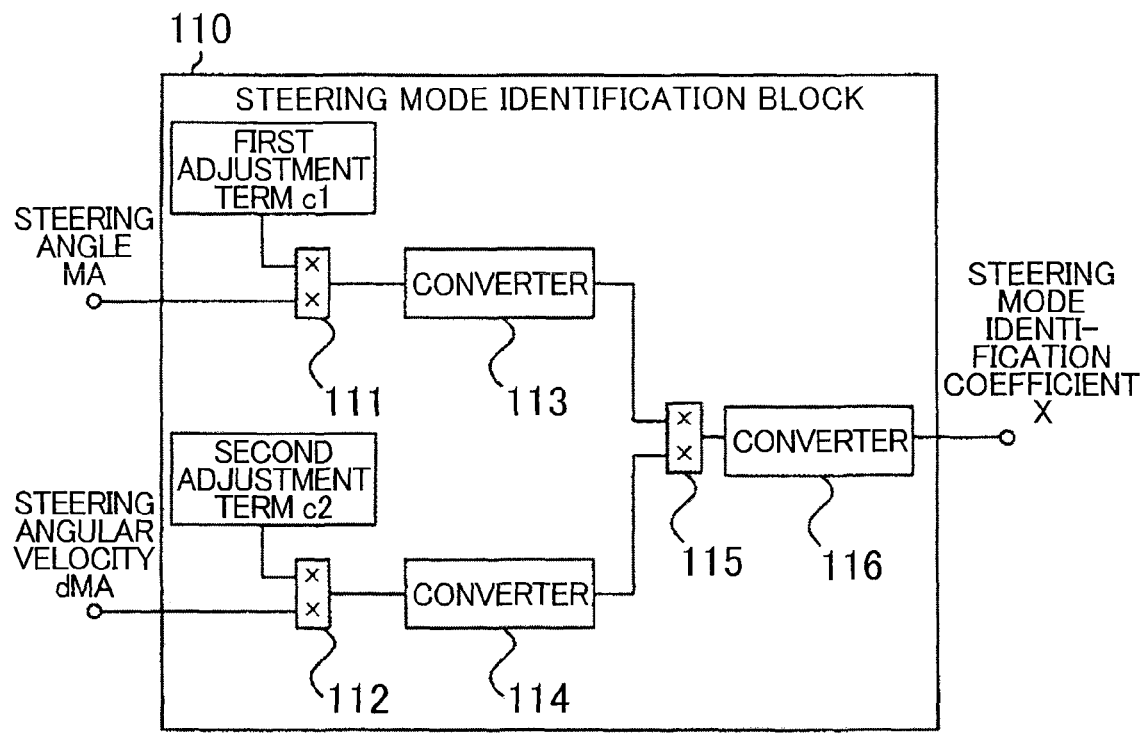
FIG. 3A is a block diagram that illustrates the process of calculating a steering mode identification coefficient, which is executed by a steering mode identification block, together with the configuration of the steering mode identification block.
Figure 3B:
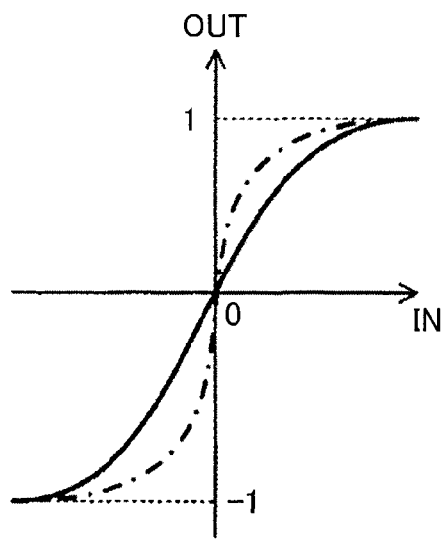
FIG. 3B and FIG. 3C are graphs that show the conversion characteristics of converters included in the steering mode identification block.
Figure 3C:
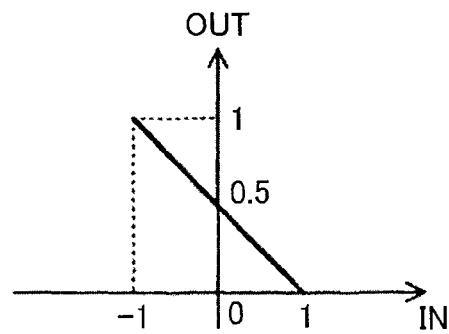

Here, the process of calculating the steering mode identification coefficient, which is executed by the steering mode identification block 110, will be described together with the configuration of the steering mode identification block 110 with reference to FIG. 3A to FIG. 3C. FIG. 3A is a block diagram that illustrates the process of calculating the steering mode identification coefficient, which is executed by the steering mode identification block 110, together with the configuration of the steering mode identification block 110. FIG. 3B is a graph that shows the conversion characteristic of each of converters 113 and 114 included in the steering mode identification block 110. FIG. 3C is a graph that shows the conversion characteristic of a converter 116 included in the steering mode identification block 110.

As shown in FIG. 3A, the steering mode identification block 110 includes a multiplier 111, a multiplier 112, the converter 113, the converter 114, a multiplier 115 and the converter 116 as processing blocks that are physically implemented as hardware circuits, or the like, inside or logically implemented as processing routines.

The steering angle MA detected by the steering angle sensor 21 is input to one of input portions of the multiplier 111. A first adjustment term c1 that is a desired constant is input to the other one of the input portions of the multiplier 111. Note that the first adjustment term c1 may be a constantly fixed constant or may be a variable value that is varied as needed. The multiplier 111 outputs the product (MA×c1) of the steering angle MA and the first adjustment term c1 to the converter 113.

The converter 113 converts the output (MA×c1) from the multiplier 111 on the basis of a desired conversion characteristic. In the present embodiment, the converter 113 converts the output (MA×c1) from the multiplier 111 using the conversion characteristic shown in FIG. 3B. Note that, in the conversion characteristic of FIG. 3B, the abscissa axis represents an input to the converter 113 (that is, the output (MA×c1) from the multiplier 111), and the ordinate axis represents an output from the converter 113. As shown in FIG. 3B, the converter 113 converts the output (MA×c1) from the multiplier 111 using a hyperbolic function tan h. That is, the output from the converter 113 is tan h(MA×c1).

Note that, by changing the first adjustment term c1, it is possible to adjust the conversion characteristic (for example, the slope, or the like, of the graph shown in FIG. 3B) of the converter 113. Specifically, for example, by changing the first adjustment term c1, it is possible to change the conversion characteristic of the converter 113 from the conversion characteristic indicated by the wide line in FIG. 3B to the conversion characteristic indicated by the alternate long and short dash line in FIG. 3B.

On the other hand, the steering angular velocity dMA detected by the steering angular velocity sensor 22 is input to one of input portions of the multiplier 112. A second adjustment term c2 that is a desired constant is input to the other one of the input portions of the multiplier 112. Note that the second adjustment term c2 may be a constantly fixed constant or may be a variable value that is varied as needed. The multiplier 112 outputs the product (dMA×c2) of the steering angular velocity dMA and the second adjustment term c2 to the converter 114.

The converter 114 converts the output (dMA×c2) from the multiplier 112 on the basis of a desired conversion characteristic. Note that the conversion characteristic of the converter 114 may be the same as the conversion characteristic of the converter 113. That is, the output from the multiplier 114 is tan h(dMA×c2). Note that it is possible to adjust the conversion characteristic of the converter 114 by changing the second adjustment term c2 as in the case of the conversion characteristic of the converter 113.

The output (tan h(MA×c1)) from the converter 113 and the output (tan h(dMA×c2)) from the converter 114 are multiplied by each other by the multiplier 115.

The converter 116 converts the output (tan h(MA×c1)×tan h(dMA×c2)) from the multiplier 115 on the basis of a desired conversion characteristic. In the present embodiment, the converter 116 converts the output (tan h(MA×c1)× tan h(dMA×c2)) from the multiplier 115 using the conversion characteristic shown in FIG. 3C. Note that, in the conversion characteristic shown in FIG. 3C, the abscissa axis represents an input to the converter 116 (that is, the output ((tan h(MA×c1)×tan h(dMA×c2)) from the multiplier 115), and the ordinate axis represents the output from the converter 116. As shown in FIG. 3C, the converter 116 has such a conversion characteristic that (output value)=−0.5× (input value)+0.5. As a result, a value that is based on the steering mode of the steering 11 and that falls within the range from 0 to 1 is output from the converter 116 as the steering mode identification coefficient X.

The steering mode identification coefficient X has a value that falls within the range from about "0" to "0.5" when the steering mode of the steering 11 is the turn steering. On the other hand, the steering mode identification coefficient X has a value that falls within the range from about "0.5" to "1" when the steering mode of the steering 11 is the return steering.

Note that the steering mode identification block 110 shown in FIG. 3A outputs a value that falls within the range of 0 to 1 as the steering mode identification coefficient X. In this way, one of the reasons why the value that falls within the range from 0 to 1 is output as the steering mode identification coefficient X is that the first adjustment term c1 is multiplied by the steering angle MA and the second adjustment term c2 is multiplied by the steering angular velocity dMA. On the other hand, the steering mode identification block 110 may output any one of 0 and 1 as the steering mode identification coefficient X. For example, the steering mode identification block 110 may output "0" as the steering mode identification coefficient X when the steering mode of the steering 11 is the turn steering. On the other hand, for example, the steering mode identification block 110 may output "1" as the steering mode identification coefficient X when the steering mode of the steering 11 is the return steering. When one of "0" and "1" is output as the steering mode identification coefficient X in this way, multiplication of the steering angle MA by the first adjustment term c1 and multiplication of the steering angular velocity dMA by the second adjustment term c2 do not need to be performed in the steering mode identification block 110.

In addition, the conversion characteristic of each of the converters 113 and 114, shown in FIG. 3B, is just one example, and at least one of the converters 113 and 114 may have a conversion characteristic different from the conversion characteristic shown in FIG. 3B. Similarly, the conversion characteristic of the converter 116, shown in FIG. 3C, is just one example, and the converter 116 may have a conversion characteristic different from the conversion characteristic shown in FIG. 3C.

In addition, the steering mode identification block 110 shown in FIG. 3A identifies the steering mode of the steering 11 on the basis of the steering angle MA and the steering angular velocity dMA. However, the steering mode identification block 110 may identify the steering mode of the steering 11 on the basis of selected parameters, other than the steering angle MA and the steering angular velocity dMA. For example, the steering mode identification block 110 may identify the steering mode of the steering 11 on the basis of the steering torque MT that is a torque by which the driver steers the steering 11 and a motor angular velocity that is the angular velocity of a drive shaft of the motor 13 (substantially, equivalent to the angular velocity of the steering shaft 12).

Referring back to FIG. 2, subsequently, the target steering reaction force setting block 120 included in the controller 100 calculates a target steering reaction force (hereinafter, referred to as "target steering reaction force K1" where appropriate) to be applied when the steering mode of the steering 11 is the turn steering (step S102). At this time, the target steering reaction force setting block 120 may set the target steering reaction force K1 at the time of the turn steering on the basis of the steering angle MA that is detected by the steering angle sensor 21, the vehicle speed V that is detected by the vehicle speed sensor 23 and a turn steering reaction force map 123 (see FIG. 4B) (described later). Alternatively, the target steering reaction force setting block 120 may set the target steering reaction force K1 at the time of the turn steering on the basis of the steering angular velocity dMA that is detected by the steering angular velocity sensor 22, the vehicle speed V that is detected by the vehicle speed sensor 23 and the turn steering reaction force map 123 (see FIG. 4C) (described later).

In tandem with or in parallel with the process of step S102, the target steering reaction force setting block 120 included in the controller 100 calculates a target steering reaction force (hereinafter, referred to as "target steering reaction force K2" where appropriate) to be applied when the steering mode of the steering 11 is the return steering (step S103). At this time, the target steering reaction force setting block 120 may set the target steering reaction force K2 at the time of the return steering on the basis of the steering angle MA that is detected by the steering angle sensor 21, the vehicle speed V that is detected by the vehicle speed sensor 23 and a return steering reaction force map 124 (see FIG. 4D) (described later). Alternatively, the target steering reaction force setting block 120 may set the target steering reaction force K2 at the time of the return steering on the basis of the steering angular velocity dMA that is detected by the steering angular velocity sensor 22, the vehicle speed V that is detected by the vehicle speed sensor 23 and the return steering reaction force map 124 (see FIG. 4E) (described later).

After that, the target steering reaction force setting block 120 calculates the weighted average based on the steering mode identification coefficient X between the target steering reaction force K1 calculated in step S102 and the target steering reaction force K2 calculated in step S103 (step S104). Specifically, the target steering reaction force setting block 120 calculates $K1 \times (1-X) + K2 \times X$ as the weighted average. The calculated weighted average is a final target steering reaction force K.

Figure 4B:
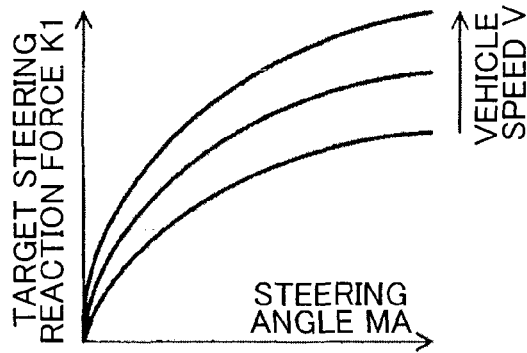
FIG. 4B to 4E are graphs that show the mapping characteristics of reaction force maps that are consulted by a reaction force calculation unit included in the target steering reaction force setting block.
Figure 4D:
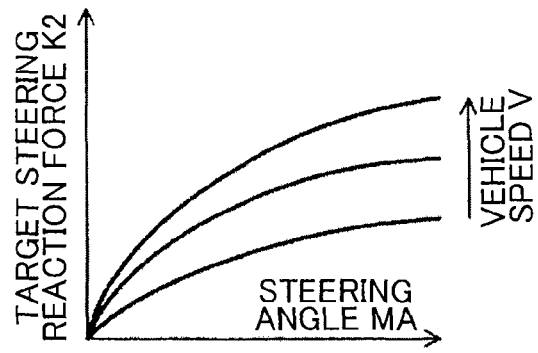
Figure 4C:
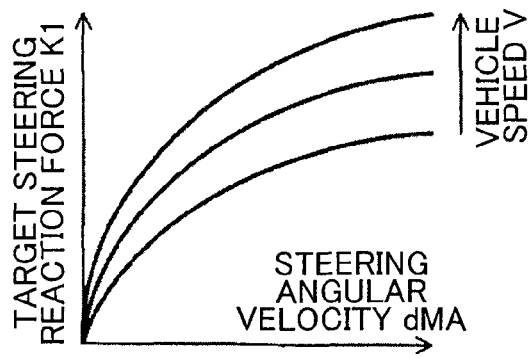
Figure 4E:
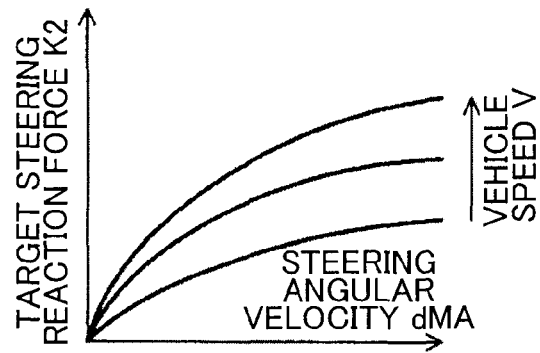

Here, the processes from step S102 to step S104 of FIG. 2, which are executed by the target steering reaction force setting block 120, together with the configuration of the target steering reaction force setting block 120 will be described with reference to FIG. 4A to FIG. 4E. FIG. 4A is a block diagram that illustrates the processes from step S102 to step S104 of FIG. 2, which are executed by the target steering reaction force setting block 120, together with the configuration of the target steering reaction force setting block 120. FIG. 4B and FIG. 4C are graphs that show the mapping characteristics of the turn steering reaction force map 123 that is consulted by a reaction force calculation unit 121 included in the target steering reaction force setting block 120. FIG. 4D and FIG. 4E are graphs that show the mapping characteristics of the return steering reaction force map 124 that is consulted by a reaction force calculation unit 122 included in the target steering reaction force setting block 120.

As shown in FIG. 4A, the target steering reaction force setting block 120 includes the reaction force calculation unit 121, the reaction force calculation unit 122, the turn steering reaction force map 123, the return steering reaction force map 124, a subtracter 125, a multiplier 126, a multiplier 127 and an adder 128.

The steering angle MA detected by the steering angle sensor 21 and the vehicle speed V detected by the vehicle speed sensor 23 may be input to the reaction force calculation unit 121. In this case, the reaction force calculation unit 121 calculates the target steering reaction force K1 (that is, the target steering reaction force to be applied when the steering mode of the steering 11 is the turn steering) on the basis of the input steering angle MA, the input vehicle speed V and the turn steering reaction force map 123.

The turn steering reaction force map 123 that is consulted by the reaction force calculation unit 121 when the steering angle MA and the vehicle speed V are input to the reaction force calculation unit 121 is a map that defines the target steering reaction force K1 on the basis of the steering angle MA and the vehicle speed V as shown in FIG. 4B. As shown in FIG. 4B, the turn steering reaction force map 123 defines the target steering reaction force K1 such that the target steering reaction force K1 increases as the steering angle MA increases and the target steering reaction force K1 increases as the vehicle speed V increases.

Alternatively, the steering angular velocity dMA detected by the steering angular velocity sensor 22 and the vehicle speed V detected by the vehicle speed sensor 23 may be input to the reaction force calculation unit 121. In this case, the reaction force calculation unit 121 calculates the target steering reaction force K1 (that is, the target steering reaction force to be applied when the steering mode of the steering 11 is the turn steering) on the basis of the input steering angular velocity dMA, the input vehicle speed V and the turn steering reaction force map 123.

The turn steering reaction force map 123 that is consulted by the reaction force calculation unit 121 when the steering angular velocity dMA and the vehicle speed V are input to the reaction force calculation unit 121 is a map that defines the target steering reaction force K1 on the basis of the steering angular velocity dMA and the vehicle speed V as shown in FIG. 4C. As shown in FIG. 4C, the turn steering reaction force map 123 defines the target steering reaction force K1 such that the target steering reaction force K1 increases as the steering angular velocity dMA increases and the target steering reaction force K1 increases as the vehicle speed V increases.

In addition, the steering angle MA detected by the steering angle sensor 21 and the vehicle speed V detected by the vehicle speed sensor 23 may be input to the reaction force calculation unit 122. In this case, the reaction force calculation unit 122 calculates the target steering reaction force K2 (that is, the target steering reaction force to be applied when the steering mode of the steering 11 is the return steering) on the basis of the input steering angle MA, the input vehicle speed V and the return steering reaction force map 124.

The return steering reaction force map 124 that is consulted by the reaction force calculation unit 122 when the steering angle MA and the vehicle speed V are input to the reaction force calculation unit 122 is a map that defines the target steering reaction force K2 on the basis of the steering angle MA and the vehicle speed V as shown in FIG. 4D. As shown in FIG. 4D, the return steering reaction force map 124 defines the target steering reaction force K2 such that the target steering reaction force K2 increases as the steering angle MA increases and the target steering reaction force K2 increases as the vehicle speed V increases.

Alternatively, the steering angular velocity dMA detected by the steering angular velocity sensor 22 and the vehicle speed V detected by the vehicle speed sensor 23 may be input to the reaction force calculation unit 122. In this case, the reaction force calculation unit 122 calculates the target steering reaction force K2 (that is, the target steering reaction force to be applied when the steering mode of the steering 11 is the return steering) on the basis of the input steering angular velocity dMA, the input vehicle speed V and the return steering reaction force map 124.

The return steering reaction force map 124 that is consulted by the reaction force calculation unit 122 when the steering angular velocity dMA and the vehicle speed V are input to the reaction force calculation unit 123 is a map that defines the target steering reaction force K2 on the basis of the steering angular velocity dMA and the vehicle speed V as shown in FIG. 4E. As shown in FIG. 4E, the return steering reaction force map 124 defines the target steering reaction force K2 such that the target steering reaction force K2 increases as the steering angular velocity dMA increases and the target steering reaction force K2 increases as the vehicle speed V increases.

In the present embodiment, particularly, the mapping characteristic of the turn steering reaction force map 123 (for example, the shape of the graph shown in FIG. 4B or FIG. 4C) differs from the mapping characteristic of the return steering reaction force map 124 (for example, the shape of the graph shown in FIG. 4D or FIG. 4E). As a result, the target steering reaction force K1 that is defined by the turn steering reaction force map 123 differs from the target steering reaction force K2 that is defined by the return steering reaction force map 124.

More specifically, when focusing on the same steering angle MA and the same vehicle speed V, the target steering reaction force K1 that is defined by the turn steering reaction force map 123 shown in FIG. 4B differs from the target steering reaction force K2 that is defined by the return steering reaction force map 124 shown in FIG. 4D. FIG. 4B and FIG. 4D show examples in which the target steering reaction force K1 that is defined by the turn steering reaction force map 123 is larger than the target steering reaction force K2 that is defined by the return steering reaction force map 124. However, the target steering reaction force K1 that is defined by the turn steering reaction force map 123 may be smaller than the target steering reaction force K2 that is defined by the return steering reaction force map 124.

Alternatively, when focusing on the same steering angular velocity dMA and the same vehicle speed V, the target steering reaction force K1 that is defined by the turn steering reaction force map 123 shown in FIG. 4C differs from the target steering reaction force K2 that is defined by the return steering reaction force map 124 shown in FIG. 4E. FIG. 4C and FIG. 4E show examples in which the target steering reaction force K1 that is defined by the turn steering reaction force map 123 is larger than the target steering reaction force K2 that is defined by the return steering reaction force map 124. However, the target steering reaction force K1 that is defined by the turn steering reaction force map 123 may be smaller than the target steering reaction force K2 that is defined by the return steering reaction force map 124.

On the other hand, the steering mode identification coefficient X calculated by the steering mode identification block 110 is input to one of input portions of the subtracter 125. A constant "1" is input to the other one of the input portions of the subtracter 125. The subtracter 125 outputs a value (1−X), obtained by subtracting the steering mode identification coefficient X from the constant "1", to the multiplier 126.

The output (K1) of the reaction force calculation unit 121 is input to one of input portions of the multiplier 126. The output (1−X) of the subtracter 125 is input to the other one of the input portions of the multiplier 126. The multiplier 126 outputs the product (that is, K1×(1−X)) of the output (K1) from the reaction force calculation unit 121 and the output (1−X) from the subtracter 125 to the adder 128.

The output (K2) from the reaction force calculation unit 122 is input to one of input portions of the multiplier 127. The steering mode identification coefficient X is input to the other one of the input portions of the multiplier 127. The multiplier 127 outputs the product (that is, K2×X) of the output (K2) from the reaction force calculation unit 122 and the steering mode identification coefficient X to the adder 128.

The adder 128 adds the output (K1×(1−X)) from the multiplier 126 to the output (K2×X) from the multiplier 127. As a result, K1×(1−X)+K2×X is output from the adder 128 as the final target steering reaction force K.

Here, the process executed by the target steering reaction force setting unit 120 will be described by taking the case where the steering mode identification coefficient X is "0" (that is, the case where the steering mode of the steering 11 is the turn steering) as an example. In this case, "1−X (X="0")=1" is output from the subtracter 125 to the multiplier 126. As a result, the target steering reaction force K1 is directly output from the multiplier 126 to the adder 128. On the other hand, the steering mode identification coefficient X (="0") is input to one of the input portions of the multiplier 127, so nothing is output (or "0" is output) from the multiplier 127 to the adder 128. As a result, the target steering reaction force K1 at the time of the turn steering is output from the adder 128 as the final target steering reaction force K.

In addition, the process executed by the target steering reaction force setting unit 120 will be described by taking the case where the steering mode identification coefficient X is "1" (that is, the case where the steering mode of the steering 11 is the return steering) as an example. In this case, "1−X(X="1")=0" is output from the subtracter 125 to the multiplier 126. Therefore, nothing is output (or "0" is output) from the multiplier 126 to the adder 128. On the other hand, the steering mode identification coefficient X (="1") is input to one of the input portions of the multiplier 127, so the target steering reaction force K2 is directly output from the multiplier 127 to the adder 128. As a result, the target steering reaction force K2 at the time of the return steering is output from the adder 128 as the final target steering reaction force K.

In addition, the process executed by the target steering reaction force setting unit 120 will be described by taking the case where the steering mode identification coefficient X is "0.5" as an example. Note that the steering mode of the steering 11 in which the steering mode identification coefficient X is "0.5" may be a state where the steering 11 is fully turned and stopped (state where MA=maximum and dMA=0) as an example. In this case, "1−X(X="0.5")=0.5" is output from the subtracter 125 to the multiplier 126. Therefore, "K1×0.5" is output from the multiplier 126 to the adder 128. On the other hand, the steering mode identification coefficient X (="0.5") is input to one of the input portions of the multiplier 127, so "K2×0.5" is output from the multiplier 127 to the adder 128. As a result, the weighted average based on the steering mode identification coefficient X between the target steering reaction force K1 and the target steering reaction force K2 (that is, 0.5×K1+0.5×K2) is output from the adder 128 as the final target steering reaction force K.

Referring back to FIG. 2, after that, the motor control block 130 included in the controller 100 controls the motor 13 such that the final target steering reaction force K set in step S104 is applied to the steering 11 (step S105). As a result, reaction force control based on the target steering reaction force K is executed.

As described above, with the controller 100 according to the present embodiment, it is possible to set the target steering reaction force K such that the target steering reaction force K changes on the basis of the steering mode of the steering 11. Thus, the controller 100 is able to set the target steering reaction force K in consideration of a difference in the steering mode of the steering 11. Therefore, for example, there is a less possibility or almost no possibility or no possibility that a feeling of strangeness of steering feeling due to a difference in the steering mode of the steering 11 is experienced by the driver. As a result, it is possible to improve driver's steering feeling.

Note that, in order to further specifically describe the advantageous effect that steering feeling is improved through reaction force control that is executed by the controller 100 according to the present embodiment, a controller in which the target steering reaction force K remains unchanged on the basis of the steering mode of the steering 11 (that is, the target steering reaction force K is set on the basis of a single reaction force map) will be described as a comparative example.

In the controller according to the comparative example, for example, the target steering reaction force K is set by placing importance on steering feeling when the steering mode of the steering 11 is the turn steering. In order to improve steering feeling when the steering mode of the steering 11 is the turn steering, a reaction force applied to the steering 11 desirably increases as the steering 11 is steered more. Therefore, in this case, the target steering reaction force K is set such that the target steering reaction force K increases as the steering angle MA of the steering 11 increases. However, when the steering mode of the steering 11 is changed to the return steering in this state, the steering angle MA of the steering 11 is relatively large, so the set target steering reaction force K also remains relatively large. Thus, when the driver releases hands from the steering 11 in order to return the steering 11, a return speed of the steering 11 is relatively high and, as a result, feeling of strangeness may be experienced by the driver.

On the other hand, in the controller according to the comparative example, for example, the target steering reaction force K is set by placing importance on steering feeling when the steering mode of the steering 11 is the return steering. In order to improve steering feeling when the steering mode of the steering 11 is the return steering, the target steering reaction force K is set such that the target steering reaction force K does not increase so much even when the steering angle MA of the steering 11 is relatively large. However, when the steering mode of the steering 11 is changed to the turn steering in this state, the amount of increase in the target steering reaction force K is not so large with respect to the amount of increase in the steering angle MA of the steering 11, so the steering 11 is light and, as a result, feeling of strangeness may be experienced by the driver.

With the controller 100 according to the present embodiment, in consideration of such a feeling of strangeness, it is possible to set the target steering reaction force K such that the target steering reaction force K changes on the basis of the steering mode of the steering 11. Thus, the controller 100 according to the present embodiment is able to improve driver's steering feeling in comparison with the controller according to the comparative example.

In addition, in the present embodiment, the steering mode of the steering 11 is identified using the steering mode identification coefficient X that falls within the range from 0 to 1. Furthermore, the weighted average based on such the steering mode identification coefficient X between the target steering reaction force K1 and the target steering reaction force K2 is set as the final target steering reaction force K. Therefore, the target steering reaction force K almost does not suddenly change from the target steering reaction force K1 at the time of the turn steering to the target steering reaction force K2 at the time of the return steering at the instance at which the steering mode of the steering 11 changes from the turn steering to the return steering. That is, even when the steering mode of the steering 11 changes from the turn steering to the return steering, the target steering reaction force K smoothly changes. Similarly, the target steering reaction force K almost does not suddenly change from the target steering reaction force K2 at the time of the return steering to the target steering reaction force K1 at the time of the turn steering at the instance at which the steering mode of the steering 11 changes from the return steering to the turn steering. That is, even when the steering mode of the steering 11 changes from the return steering to the turn steering, the target steering reaction force K smoothly changes. Thus, there is a less possibility or almost no possibility or no possibility that a feeling of strangeness due to a sudden change of driving feeling is experienced by the driver.

(3) Alternative Example

Figure 5:
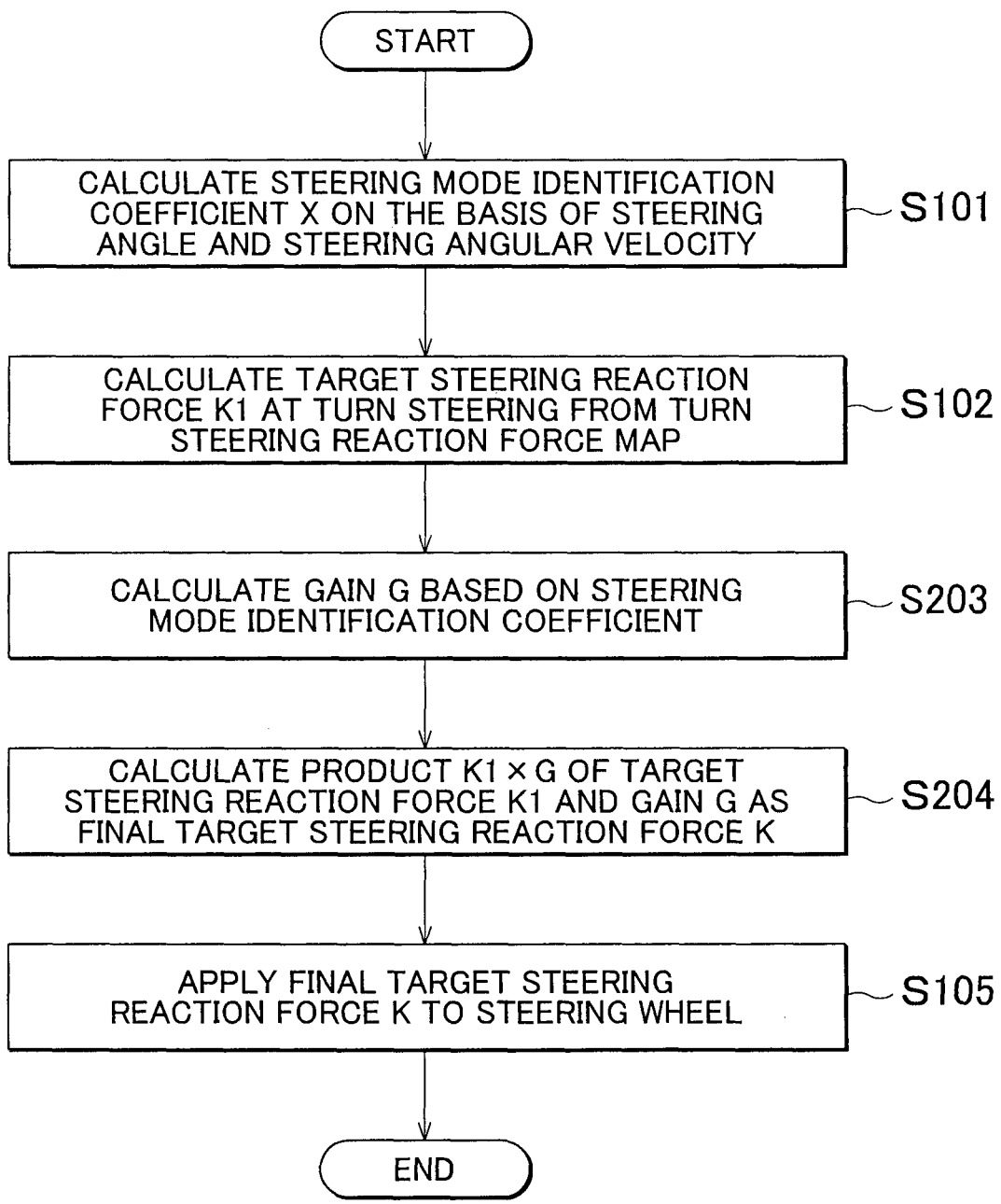
FIG. 5 is a flowchart that shows the flow of an alternative example of reaction force control that is mainly executed by the controller according to the present embodiment.

Next, an alternative example of reaction force control that is mainly executed by the controller 100 according to the present embodiment will be described with reference to FIG. 5. FIG. 5 is a flowchart that shows the flow of the alternative example of reaction force control that is mainly executed by the controller 100 according to the present embodiment. Note that, in FIG. 5, like step numbers denote the same operations as the operations shown in FIG. 2, and the detailed description thereof is omitted.

As shown in FIG. 5, first, the steering mode identification block 110 included in the controller 100 identifies the steering mode of the steering 11 (step S101). That is, the steering mode identification block 110 calculates the steering mode identification coefficient X for identifying the steering mode of the steering 11.

Subsequently, the target steering reaction force setting block 120 included in the controller 100 calculates the target steering reaction force K1 to be applied when the steering mode of the steering 11 is the turn steering (step S102).

In tandem with or in parallel with the process of step S102, the target steering reaction force setting block 120 included in the controller 100 calculates a gain G that is used to execute gain control over the target steering reaction force K1 calculated in step S102 (step S203). At this time, the target steering reaction force setting block 120 calculates the gain G on the basis of the steering mode identification coefficient X calculated in step S101 and a gain map 224 (see FIG. 6B) (described later).

After that, the target steering reaction force setting block 120 calculates the product of the target steering reaction force (a pre-target steering reaction force) K1 calculated in step S102 and the gain G calculated in step S203 (step S204). Specifically, the target steering reaction force setting block 120 calculates K1×G as the product. The calculated product is the final target steering reaction force K.

After that, the motor control block 130 included in the controller 100 controls the motor 13 such that the final target steering reaction force K set in step S204 is applied to the steering 11 (step S105). As a result, reaction force control based on the target steering reaction force K is executed.

Figure 6A:
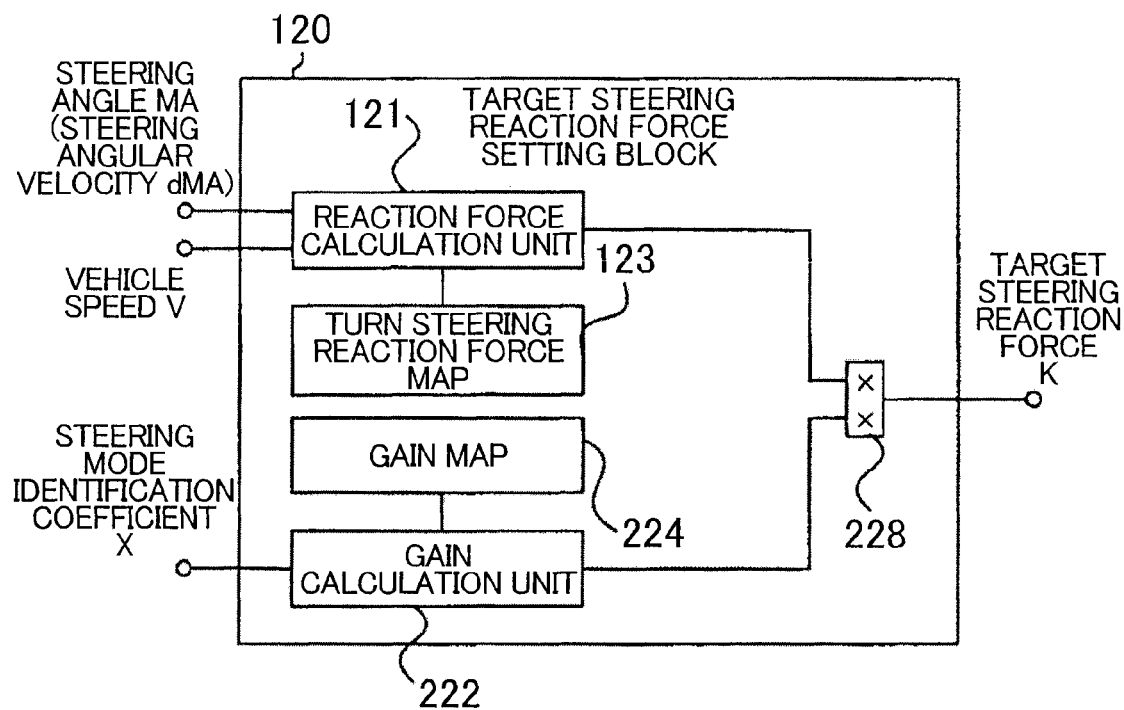
FIG. 6A is a block diagram that illustrates processes from step S203 to step S204 of FIG. 5, which are executed by a target steering reaction force setting block, together with the configuration of the target steering reaction force setting block.
Figure 6B:
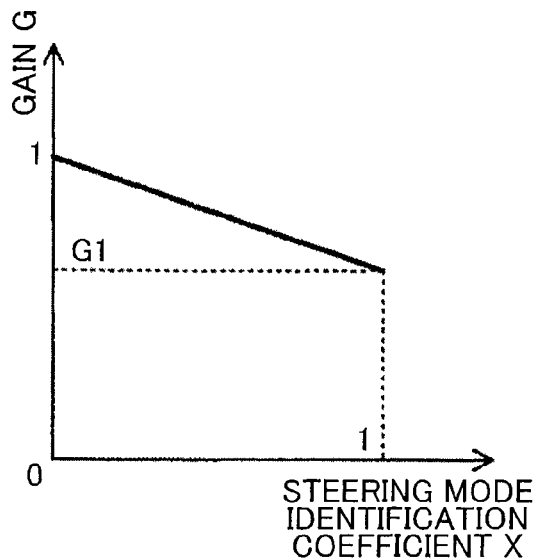
FIG. 6B and FIG. 6C are graphs that show the mapping characteristics of gain maps that are consulted by a gain calculation unit included in the target steering reaction force setting block.
Figure 6C:
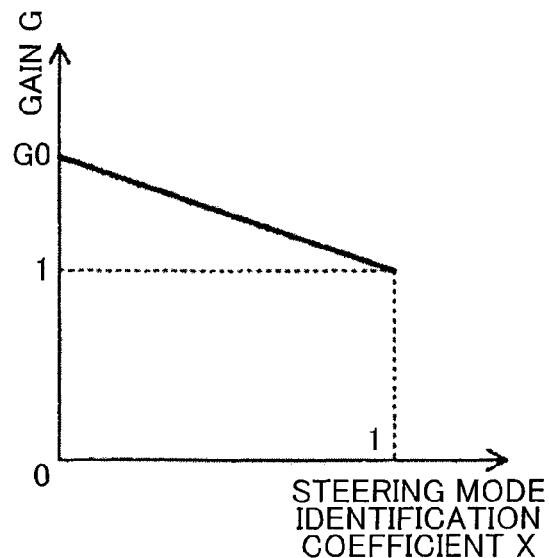

Here, the processes from step S203 to step S204 of FIG. 5, which are executed by the target steering reaction force setting block 120, together with the configuration of the target steering reaction force setting block 120 will be described with reference to FIG. 6A to FIG. 6C. FIG. 6A is a block diagram that illustrates processes from step S203 to step S204 of FIG. 5, which are executed by the target steering reaction force setting block 120, together with the configuration of the target steering reaction force setting block 120. FIG. 6B and FIG. 6C are graphs that show the mapping characteristics of a gain map 224 that is consulted by a gain calculation unit 222 included in the target steering reaction force setting block 120.

As shown in FIG. 6A, the target steering reaction force setting block 120 that executes the alternative example includes the gain calculation unit 222, the gain map 224 and a multiplier 228 in addition to the above-described reaction force calculation unit 121 and turn steering reaction force map 123. Note that the operation of the reaction force calculation unit 121 for setting the target steering reaction force K1 on the basis of the turn steering reaction force map 123 has been already described, so the detailed description is omitted.

The steering mode identification coefficient X calculated by the steering mode identification block 110 is input to the gain calculation unit 222. The gain calculation unit 222 calculates the gain G on the basis of the input steering mode identification coefficient X and the gain map 224.

As shown in FIG. 6B, the gain map 224 is a map that defines the gain G on the basis of the steering mode identification coefficient X. As shown in FIG. 6B, the gain map 224 defines the gain G such that the gain G becomes 1 when the steering mode identification coefficient X is 0 and the gain G reduces as the steering mode identification coefficient X increases. Note that the gain map 224 desirably defines the gain G such that a value obtained by multiplying the target steering reaction force K1 by a gain G1 (G1<1) when the steering mode identification coefficient X is 1 is equal to the above-described target steering reaction force K2 (that is, the target steering reaction force to be applied when the steering mode of the steering 11 is the return steering). That is, the gain map 224 desirably defines the gain G such that K1×G1=K2.

The output (K1) from the reaction force calculation unit 121 is input to one of input portions of the multiplier 228. The output (G) from the gain calculation unit 222 is input to the other one of the input portions of the multiplier 228. The multiplier 228 multiplies the output (K1) from the reaction force calculation unit 121 by the output (G) from the gain calculation unit 222. As a result, K1×G is output from the multiplier 228 as the final target steering reaction force K.

Here, the process executed by the target steering reaction force setting unit 120 will be described by taking the case where the steering mode identification coefficient X is "0" (that is, the case where the steering mode of the steering 11 is the turn steering) as an example. In this case, "G (=1)" is output from the gain calculation unit 224. As a result, the target steering reaction force K1 at the time of the turn steering is directly output from the multiplier 228 as the final target steering reaction force K.

In addition, the process executed by the target steering reaction force setting unit 120 will be described by taking the case where the steering mode identification coefficient X is "1" (that is, the case where the steering mode of the steering 11 is the return steering) as an example. In this case, "G1" is output from the gain calculation unit 224. As a result, the target steering reaction force K2 t the time of the return steering (in other words, (target steering reaction force K1 at the time of the turn steering)×gain G1) is directly output from the multiplier 228 as the final target steering reaction force K.

In addition, the process executed by the target steering reaction force setting unit 120 will be described by taking the case where the steering mode identification coefficient X is "0.5" as an example. In this case, "G" is output from the gain calculation unit 224. As a result, the product (that is, K1×G) of the target steering reaction force K1 and the gain G is output from the multiplier 228 as the final target steering reaction force K. In other words, the above-described weighted average based on the steering mode identification coefficient X between the target steering reaction force K1 and the target steering reaction force K2 (that is, 0.5×K1+0.5×K2) is substantially output from the multiplier 228 as the final target steering reaction force K.

As described above, with the controller 100 that executes the alternative example of reaction force control as well, it is possible to set the target steering reaction force K such that the target steering reaction force K changes on the basis of the steering mode of the steering 11. Thus, in the alternative example as well, the above-described various advantageous effects are suitably obtained.

Note that, in FIG. 5 to FIG. 6C, the description is made on the example in which the controller 100 calculates the target steering reaction force K1 to be applied when the steering mode of the steering 11 is the turn steering and multiplies the target steering reaction force K1 by the gain G. However, the controller 100 may calculate the target steering reaction force K2 to be applied when the steering mode of the steering 11 is the return steering and multiply the target steering reaction force K2 by the gain G. In this case, the reaction force calculation unit 121 and the turn steering reaction force map 123 shown in FIG. 6A are desirably replaced with the reaction force calculation unit 122 and the return steering reaction force map 124 shown in FIG. 4A. In addition, the gain map 224 that is used to calculate the gain G that is multiplied by the target steering reaction force K2 desirably has the mapping characteristic shown in FIG. 6C. Specifically, as shown in FIG. 6C, the gain map 224 defines the gain G such that the gain G becomes 1 when the steering mode identification coefficient X is 1 and the gain G increases as the steering mode identification coefficient X reduces. Note that the gain map 224 desirably defines the gain G such that a value obtained by multiplying the target steering reaction force K2 by a gain G0 (G0>1) when the steering mode identification coefficient X is 0 is equal to the above-described target steering reaction force K1 (that is, the target steering reaction force to be applied when the steering mode of the steering 11 is the turn steering). That is, the gain map 224 desirably defines the gain G such that K2×G0=K1.

The invention is not limited to the above-described embodiment; it may be modified as needed within the scope of the invention read from the appended claims and the specification or without departing from the spirit of the invention. A vehicle steering system having such modifications is also included in the technical scope of the invention.

The invention claimed is:

1. A vehicle steering system, comprising:
an electronic control unit configured to:
i) set a target steering reaction force to be applied to a steering wheel on the basis of a steering angle of the steering wheel,
ii) set the target steering reaction force on the basis of a degree of turn steering and a degree of return steering, the turn steering and the return steering being steering modes of the steering wheel, an absolute value of a steered angle of a steered wheel being increased in the turn steering, and the absolute value of the steered angle being reduced in the return steering, and
(iii) apply the target steering reaction force set by the electronic control unit to the steering wheel, wherein
the electronic control unit sets a weighted average as the target steering reaction force,
the weighted average is an average between the target steering reaction force that is set when the steering mode is the turn steering and the target steering reaction force that is set when the steering mode is the return steering, and
the weighted average is based upon the degree of the turn steering and the degree of return steering.

2. The vehicle steering system according to claim 1, wherein
the electronic control unit sets the target steering reaction force so that the target steering reaction force that is set when the steering mode is the turn steering differs from the target steering reaction force that is set when the steering mode is the return steering.

3. The vehicle steering system according to claim 1, wherein
the electronic control unit sets the target steering reaction force on the basis of at least one of a proportional term of the steering angle and a derivative term of the steering angle.

4. The vehicle steering system according to claim 3, wherein
the electronic control unit sets the target steering reaction force on the basis of at least one of a plurality of pieces of mapping information, each of which defines a correlation between at least one of the proportional term of the steering angle and the derivative term of the steering angle and the target steering reaction force, and
the electronic control unit sets the target steering reaction force on the basis of the degree of the turn steering and the degree of the return steering by selecting the at least one of the pieces of mapping information on the basis of the degree of the turn steering and the degree of the return steering.

5. The vehicle steering system according to claim 4, wherein
the plurality of pieces of mapping information include:
(i) first mapping information that defines a correlation between at least one of the proportional term of the steering angle and the derivative term of the steering angle when the steering mode is the turn steering and the target steering reaction force, and
(ii) second mapping information that defines a correlation between at least one of the proportional term of the steering angle and the derivative term of the steering angle when the steering mode is the return steering and the target steering reaction force, and
the weighted average is an average between the target steering reaction force that is set on the basis of the first mapping information and the target steering reaction force that is set on the basis of the second mapping information.

6. The vehicle steering system according to claim 3, wherein
the electronic control unit calculates a pre-target steering reaction force on the basis of mapping information that defines a correlation between at least one of the proportional term of the steering angle and the derivative term of the steering angle and the target steering reaction force, and sets the target steering reaction force by multiplying the calculated pre-target steering reaction force by a predetermined gain that is determined on the basis of whether the steering mode of the steering wheel is the turn steering or the return steering.

7. The vehicle steering system according to claim 1, wherein:
the electronic control unit identifies the degree of the turn steering and the degree of the return steering, and
the electronic control unit sets the target steering reaction force so that the target steering reaction force changes on the basis of the identified steering mode.

8. The vehicle steering system according to claim 7, wherein
the electronic control unit identifies the degree of the turn steering and the degree of the return steering on the basis of the steering angle and a steering angular velocity of the steering wheel.

9. A steering method for a vehicle including an electronic control unit, comprising:
setting, by the electronic control unit, a target steering reaction force to be applied to a steering wheel on the basis of a steering angle of the steering wheel;
setting, by the electronic control unit, the target steering reaction force on the basis of a degree of turn steering and a degree of return steering, the turn steering and the return steering being steering modes of the steering wheel, an absolute value of a steered angle of a steered wheel being increased in the turn steering, and the absolute value of the steered angle being reduced in the return steering;
setting, by the electronic control unit, a weighted average as the target steering reaction force, wherein the weighted average is an average between the target steering reaction force that is set when the steering mode is the turn steering and the target steering reaction force that is set when the steering mode is the return steering, and the weighted average is based upon the degree of the turn steering and the degree of return steering; and
applying, by the electronic control unit, the set target steering reaction force to the steering wheel.

* * * * *